Feb. 13, 1940.                H. R. ANSEL                2,190,142
                             ANTISKID DEVICE
                          Filed Feb. 26, 1937

INVENTOR.
Harry R. Ansel
BY
W.S. Babcock
ATTORNEY.

Patented Feb. 13, 1940

2,190,142

UNITED STATES PATENT OFFICE 2,190,142

ANTISKID DEVICE

Harry R. Ansel, Cleveland, Ohio

Application February 26, 1937, Serial No. 127,977

26 Claims. (Cl. 152—208)

The invention to be hereinafter described relates to antiskid devices.

Innumerable attempts have been made to provide adequately against slipping or skidding of wheel tires on wet or greasy surfaces, or the spinning of wheels on similar surfaces. Many varieties of chains, cleats and grips have been tried. Many designs of tire treads have been resorted to. A number of these attempts have been more or less successful, though not very high in efficiency. In every instance in which metal is brought directly into contact with the road surface, with the wheel load imposed on it at every rotation of the wheel, the device is very rapidly cut through and renewal required. Thus, of course, the various chains are of very short life, as is well known. Also, in the case of chains and similar devices, a distinct and very objectionable jar or bumping, especially in slow driving, is produced, when travelling the usual hard surface roads.

The main objects of the present invention are to provide an antiskid device which will lie dormant and inoperative and practically unworn all times except when needed, yet will infallibly, instantly, automatically come into full effective operation simultaneously with existence of the need for it. It will be ever present yet out of use and unworn at all times except when needed, and only the existence of the need will put it into operation. Instantly, arising of the need starts the operation.

Other objects of the invention are to provide a simple, efficient, durable, antiskid device which may be made in quantity at a minimum cost, one which may be easily and quickly applied, removed or renewed and one in which any one or a number of small parts or sections may be removed or renewed with least possible time, trouble, and expense and without renewal of any other part; and a device which is durable and compact and will require no modification in the least degree of any tire tread to which it may be desired to apply it.

In order to more clearly disclose the construction, operation and use of the invention, reference should be had to the accompanying drawing forming part of the present application. Throughout the several figures of the drawing, like reference characters indicate the same parts in the different views.

In the drawing:

Fig. 7 is a cross section on line 7—7 of Fig. 5, looking in the direction of the arrows;

Fig. 9 is an end view of one of the separate elements of Fig. 4, taken on line 9—9, and looking in the direction of the arrows.

The standard pneumatic tire of today is provided with one or more circumferential grooves or channels in its traction, tread or driving face. The present invention, as will later appear, makes use of such grooves. By means of these grooves, the device of the invention may be easily and economically applied and removed from a tire and instantly automatically rendered operative or inoperative, as the need for it arises or passes.

The hair on a dog's back lies from head to tail. If you stroke the dog in that direction, the hair lies flat and smooth. If you stroke it reversely, the hair is thrown out and stands up vertically at right angles to the dog's back. That principle is applied to the present invention in such a way that regular normal rotation of the wheel acts to retract the effective parts of the elements, or claws, so that there will be practically no wearing engagement of them against the road surface, while skidding of the wheel instantly projects the same parts into operative, gripping or traction position. The gripping elements are withdrawn or retracted and thrust out or projected in much the same manner as retractile claws of a cat, and for the same purpose—to release or to grip, as required.

Figure 1:
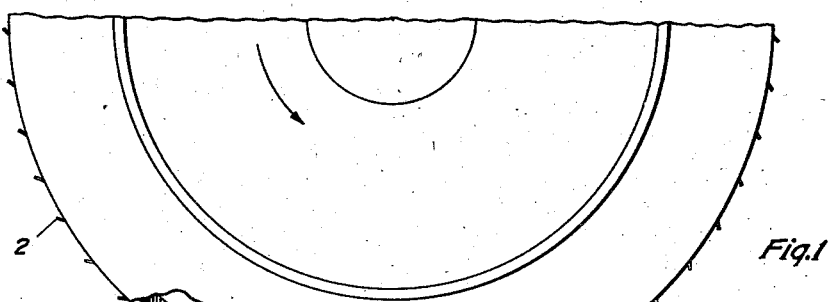
Fig. 1 is a side view, partly broken away, of part of a wheel, with the invention applied.

This action is indicated in Fig. 1. The two ground lines show normal or inoperative, and projected or operative position, respectively, of the claws. The dotted line ground line indicates forward skidding with the wheel non-rotative. The arrow indicates relative movement between tire and ground line, as though the ground line had been pulled back, while the wheel remained still. The claws in engagement with the ground line are, by the skidding, projected for gripping.

As will later appear, both operations are wholly automatic and instantaneous and exactly synchronized with occurrence of the need for the device, and the passing of the need, respectively.

Figure 5:
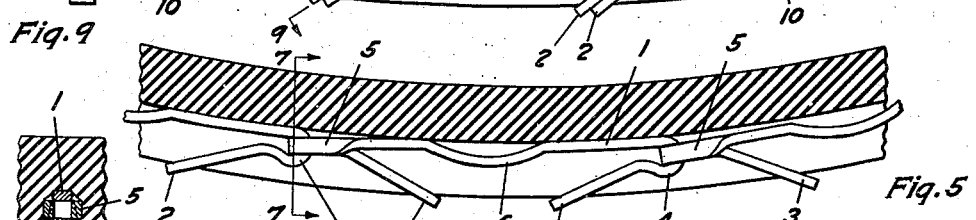
Fig. 5 is a view similar to Figs. 3 and 4, showing the preferred form.
Figure 6:
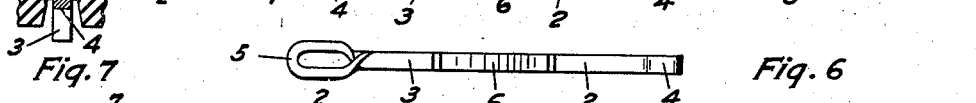
Fig. 6 is a top plan view of one of the elements of Fig. 5, separate.

Referring to the drawing in detail, and particularly to Figs. 5, 6 and 7, a plurality of gripping elements or bars 1 are provided, each substantially identical and interchangeable with all others of the same type. Preferably, they are strong resilient flat narrow bars of rust-proof spring steel. Each bar is bent upon itself to form two similar oppositely directed prongs or claws 2 and 3. In forming, claw 2 is bent directly back upon itself so that it lies directly above the rest of the bar. The bend is a gradual or rounded bend resulting in a vertically directed eye 4 in the same plane as 1 and 2 and having an inside diameter slightly greater, for free play, than the width of bar 1. In forming claw 3, the bar 1 is first twisted about its longitudinal axis at right angles, then looped elliptically to form a horizontal eye 5, and then again twisted about its axis at right angles until it overlies bar 1. The free end is then deflected radially or outwardly. The inside diameter of the eye 5 is slightly greater than the width of bar 1, as in the case of eye 4. The outside lateral diameter of eye 5 is, therefore, greater than the width of bar 1 by an amount equal to twice the thickness of the bar—see Figs. 5 and 7. Bar 1 is of a width substantially equal to the width of the bottom of the circumferential groove in the standard tire tread, with the result that when a set of these elements, assembled, is seated in a tire groove, each eye 5 will spread the rubber walls of the groove outwardly at that point, the normal position of the groove-wall being shown in dotted lines, in Fig. 7. Intermediate of the eyes 4 and 5, each bar 1 is provided with a "hump" or radially directed bend 6 for stretching, or extension of the assembled series of sets, as will later appear.

In applying the invention, a plurality of these elements is connected, the claw 2 of each being passed through the eye 5 of each next adjacent one. And, of course, the eye 4 of each, at the same time, receives the eye 5 of the other, all as clearly shown in Fig. 5.

The outside diameter of each time is known and the circumference of the bottom of the circumferential groove may be easily determined. When that is determined, enough of the claw elements are coupled together to just seat on that groove bottom. The bends 6 are so proportioned as to permit total assembled ring of elements to be stretched or extended to a diameter appreciably greater than the diameter of the groove bottom. This permits the stretched ring to pass over the greater diameter of the tire and into the groove. As it reaches the groove diameter and seats in the bottom of the groove, by contraction, it will be securely held therein. Due to the resilience of bars 1, bends 6 quickly snap the assembly into the tire groove as soon as the ring of elements passes over the greater diameter of the tread. While extension of the assembly is one of the most important advantages of the "humps" 6, a further great advantage is provision of any easy and reliable grip or handle by which the assembly may be quickly and easily removed. It is only necessary to insert one end of a tire tool, bar or the like, under the "hump" and quickly lever it out of the groove. It may be that the diameter of the particular tire is such that no number of units on the same size will provide the proper assembly diameter. To meet this possible difficulty, the elements will be made in several lengths, so that one or more shorter or longer elements may be inserted to bring the assembled set to the necessary diameter for the particular tire. Several makes of tires have more than one groove, circumferentially. A set of these devices may be used in every groove if desired, or in as many of the grooves as the individual taste may dictate. And, of course, tires which have been worn down so that the grooves are too shallow, or tires which, originally, have no such grooves may be provided with one or more grooves in well known manner.

In the preferred form of the invention, above, there are two claws 2—3 on each element or bar 1 and they are directed oppositely, for purposes to be later disclosed.

In the forms shown in Figs. 1, 2, 3, 4, 8 and 9, claws in one direction, only, are provided for each unit or element—claws 2.

Figure 8:
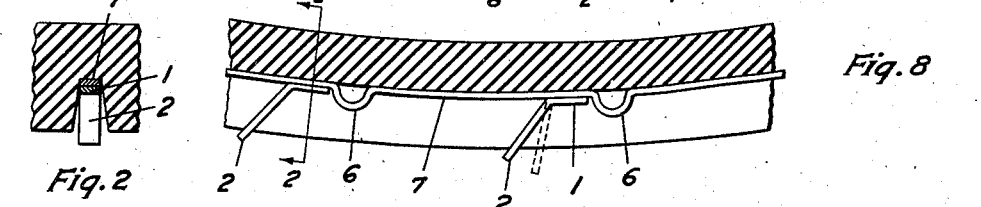
Fig. 8 is a view similar to Figs. 3, 4 and 5, showing a fourth modification, with one claw projected, in dotted lines.
Figure 2:
Fig. 2 is a cross section on line 2—2 of Fig. 8, looking in the direction of the arrows.

In the form of Figs. 2 and 8, claw 2 is simply deflected from bar 1 at an angle. A series of these bars is welded or otherwise suitably secured to a ring or band 7, at suitable intervals. Band 7 is of resilient material, preferably rust-proof spring steel and is provided with a plurality of spaced "humps" or bends 6 of the same type and for the same purposes as the "humps" 6 of the preferred form, shown in Figs. 5 and 7. Preferably, as a matter of simplification, each claw is welded to the band immediately adjacent one of the "humps" 6.

Figure 3:
Fig. 3 is a fragmentary, circumferential cross section of a wheel tire showing one form of the invention, applied.
Figure 4:
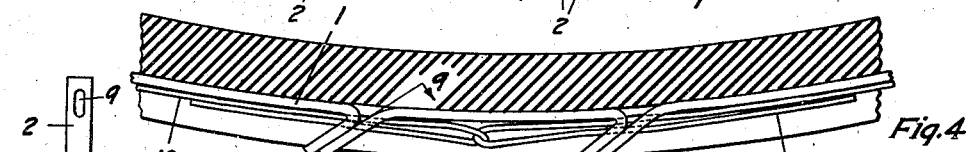
Fig. 4 is a view similar to Fig. 3, showing a modification.

In the construction of Figs. 3, 4 and 9, as in Figs. 5, 6 and 7, no continuous band 7 is used. In Fig. 3, the elements are spot welded together in such manner, as to themselves, for the band. In those figures, as in Figs. 2 and 8, the claws extend in one direction only. In those constructions, the elements are formed by taking bar 1 and bending a portion at each end to form a claw 2. The claw at one end makes a sharp or acute angle with the bar, while the claw at the other end makes a complementary obtuse angle with the same bar, the two claws being substantially parallel. A series of these elements is connected to form a ring of the desired diameter by spot welding the adjacent claws. It will be noticed that there is an open angle 8 next the tire between the claws of each weld. Also, one claw at each weld is at a gradual or obtuse angle to its bar 1. This will provide ample stretch or extension corresponding to the stretch provided by "humps" 6 in the other forms of Figs. 2, 5, 6, 7. So, when the proper number have been welded to form the band or ring of the desired diameter, it is stretched to slip over the tire and into the groove wherein it promptly seats itself, as soon as released.

In the modification of Figs. 4 and 9, the gripping element having the claws, is of the same construction as in Fig. 3. However, these elements are not spot welded together as in the modification of Fig. 3. Instead, the claws are provided with holes 9 for a binder wire 10. In this form, the correct number of gripping elements to form a circle or band of the desired diameter, are threaded onto the wire—preferably a strong, rust proof, resilient wire. One end of this wire is looped sharply back on itself and rethreaded reversely through the holes 9 of several claws. The strung elements are then seated in the bottom of the groove, the wire is drawn taut and its remaining free end is rethreaded reversely through several holes 9, after first having been looped through the loop made by reversing the first wire end to thread it back through its holes 9. The resiliency of the wire, the sharp angle at which it is bent to pass back through the holes 9, and the walls of the holes 9, securely fasten the wire ends in place. They will not pull out. There is very little strain on the wire and that, mostly, is due to the slight centrifugal action, as the wheel revolves. An important function of the wire is to simply hold the elements in their relative positions in the bottom of the groove or channel and prevent them dropping out as the wheel revolves. The weight of the auto compresses the rubber of the channel or groove very tightly around each bar 1, from end to end, as it rotates into surface engagement with the road. In this way, every bar, immediately as it reaches operative position, is securely and tightly gripped or locked to the tire and all strain on it is taken up by the tire tread. Consequently the wires 10 do not have to meet these strains.

The operation of the invention is extremely simple and perfectly automatic. In Fig. 1, the form shown as applied, may, equally well, be that of Figs. 3 or 4 or 8, it is one of the forms having only claws 2, inclined forwardly or in the direction of rotation of the wheel. The free ends project only very slightly beyond the tire tread surface. Under ordinary or normal conditions, the wheel and the tire tread will pass freely along the road surface and there will be no movement of either relatively to the other. Because claws 2 incline forwardly or in the direction of travel and rotation of the wheel and because only a very slight end or tip of the claws projects while practically the full length remains back in the groove, each claw, as its tip contacts the road surface, is being slightly depressed or pushed back into the groove. The amount of wear, therefore, is negligible. On the other hand, the claw is retracted, the load of the wheel is not on it, it is not caught and ground between the tread and road surface, and the passenger does not get the jarring ride familiar to all who have ridden on chains or the like.

Suppose, now, that the car skids. There will be relative movement between the tread and the road surface. A simple illustration is as though the wheel had stopped and the road surface were pulled backward. As long as there is no skidding, the action is like smoothing the hair on the dog's back—from head to tail. It settles down flat. In the same way, the claws settle back into their groove. But as skidding starts, the action is like "rubbing the wrong way". The hair rises and sticks out from the dog's back. In the same way, exactly, the claws rise or swing out to a more nearly vertical or radial position and their ends project into sharp antiskid engagement with the road surface. The claws are sheathed and unsheathed like the retractile claws of a cat, only automatically and instantly. The slightest start of a skid, instantly projects them and prevents further skidding. The projected position is indicated in dotted lines, just as skidding has started—in Fig. 1. In Fig. 8 one claw has also been shown, in dotted lines, as projected. The tips of the claws are at all times free to contact the road surface. Consequently, the device is always ready for instant action against side-skidding, which is much the most dangerous. The claws instantly "dig in" and hold when skidding starts, either forward or side-wise. Therefore, skidding never actually occurs. It is prevented, not merely stopped after starting.

In the preferred form, the action is identical. This form, in addition to its great simplicity of manufacture and assembly, instantly automatically prevents "spinning" of the wheel. "Spinning" produces the same relative movement between tire tread and road surface as skidding, except that the wheel rotates rapidly in its forward direction, but does not move bodily forward at a corresponding rate. The instant that this starts, claw 3 will be projected. Its operation and action will be the same as that of claw 2 in preventing skidding.

The invention is practically "foolproof." Once applied it may remain indefinitely in place, through winter and summer, through wet and dry, and its presence may be "forgotten" until it asserts itself in preventing skidding or spinning. Being mostly below the tire tread surface, it will last as long as the tire itself or longer.

Among the many advantages of the invention, especially the forms of Figs. 3 and 5 are its ready and inexpensive repair—when any bar 1 breaks or wears out, a new one at very little cost, may be quickly inserted—its quick adaptability to any size of tire; its long life—no wear except in emergences—its ever present instant readiness; its extremely low cost and mass production possibilities.

It is thought that the construction, operation and use of the invention will be clear from the preceding detailed description. Many changes may be made in the construction, arrangement and disposition of the various parts of the invention, within the scope of the appended claims, without in any degree departing from the field of the invention, and it is meant to include all such within this application, wherein only one preferred form and several modifications have been illustrated purely by way of illustration and example and with no intent to in any degree limit the invention thereby.

Having thus described my invention, what I claim and desire to protect by Letters Patent is:

1. An antiskid device for wheel tires comprising an assembly of retractile claws each adapted to be normally retracted to inoperative position and to be instantly automatically projected to operative position, and means for mounting said assembly in a tire groove.

2. An antiskid device for wheel tires comprising an element provided with a retractile claw adapted to engage a road surface, means for mounting said element in a tire groove, and means enabling variation in diameter of said mounting means to secure said mounting means in operative position.

3. An antiskid device for wheel tires comprising an element provided with a retractile claw adapted to engage a road surface and having means engageable for its removal, and means for mounting said element in a tire groove.

4. An antiskid device for wheel tires comprising an extensible resilient band adapted to be seated in a tire groove and a plurality of retractile claws carried by said band.

5. An antiskid device for wheel tires comprising an extensible resilient band adapted to be seated in a tire groove and provided with means engageable for its removal, and a plurality of retractile claws carried by said band.

6. An antiskid device comprising a plurality of similar units each provided with a retractile claw and means for securing said units in assembled relation within the groove of a tire.

7. An antiskid device for wheel tires comprising a plurality of similar units each provided with a retractile claw, means for securing said units in assembled relation within the groove of a tire, and means enabling variation in the diameter of said assembled units for seating in or removal from a tire groove.

8. An antiskid device for wheel tires comprising a circumferentially disposable unit bar adapted to be connected to similar bars for removably mounting in the circumferential groove of a tire tread and a retractile claw carried thereby.

9. An antiskid device for wheel tires comprising a circumferentially disposable unit bar adapted to be connected to similar bars for removably mounting in the circumferential groove of a tire tread, and a pair of retractile claws carried thereby.

10. An antiskid device comprising a circumferentially disposable unit bar adapted to be connected to similar bars for removably mounting in the circumferential groove of a tire tread, a pair of retractile claws carried thereby, and means carried intermediate said claws and enabling extension of said bar.

11. An antiskid device comprising a bar, a pair of retractile claws carried thereby and directed oppositely, said bar having a bend intermediate said claws for extension of said bar and for removal of said bar.

12. An antiskid device comprising a bar bent upon itself to provide retractile claws and eyes adjacent said claws, each eye being adapted to receive a claw of the next adjacent bar, said bars being interchangeable.

13. An antiskid device for wheel tires comprising an extensible and contractable ring adapted to be removably seated in a circumferential tire groove and retained therein by its resiliency, and a plurality of road-surface gripping claws carried by said ring, normally depressible to inoperative position within said groove during rotation of a wheel and automatically projectable into road-surface engagement upon commencement of skidding.

14. An antiskid device for wheel tires comprising an extensible and contractable ring adapted to be seated in a circumferential tire groove and retained therein by its resiliency, said ring comprising a plurality of units each having a road-surface engaging claw normally depressible to inoperative position within said groove during rotation of a wheel and automatically projectable into road-surface engagement upon commencement of skidding, and means securing said units together in ring formation.

15. An antiskid device for wheel tires comprising an extensible and contractable ring adapted to be removably seated in a circumferential tire groove and retained therein by its resiliency, a plurality of road-surface gripping claws carried by said ring, normally depressible to inoperative position within said groove and automatically projectable into road-surface engaging position upon commencement of skidding, and means carried by said ring for engagement and removal of said ring.

16. An antiskid device for wheel tires comprising an extensible and contractable ring adapted to be removably seated in a circumferential tire groove and retained therein by its resiliency, said ring comprising a plurality of units each having two road-surface gripping claws normally depressible to inoperative position within said groove during rotation of a wheel and automatically projectable into road-surface engagement.

17. An antiskid device for wheel tires comprising an extensible and contractable ring adapted to be removably seated in the circumferential groove of a tire and retained therein by its resiliency, said ring comprising a plurality of units each having two oppositely directed road-surface gripping claws normally depressible to inoperative position within said groove during rotation of a wheel and alternately automatically projectable into road-surface engagement.

18. An antiskid device for wheel tires comprising a ring adapted to be removably seated in a circumferential tire groove and retained therein by its resiliency, said ring comprising a plurality of extensible and contractable units each having two oppositely directed road-surface gripping claws normally depressible to inoperative position within said groove during rotation of a wheel and alternately automatically projectable into road-surface engagement.

19. An antiskid device for wheel tires comprising an extensible and contractable ring, extensible so that it may increase in diameter to pass over a wheel tire and into a circumferential groove therein, and contractable so that it may snap back into decreased diameter and securely seat in the circumferential groove, said ring being provided with a plurality of road-surface gripping claws normally depressible to inoperative position within said groove during rotation of a wheel and automatically projectable into road-surface engagement simultaneously with the start of slipping of said tire relatively to the road-surface.

20. An antiskid device for wheel tires comprising an extensible and contractable ring, extensible so that it may be increased in diameter to pass over a wheel tire and contractable so that it may snap back into decreased diameter and securely seat in the circumferential groove, said ring being provided with a plurality of road-surface gripping claws extending approximately in the same radial plane as said ring, said claws being normally depressible to inoperative position within said groove during rotation of a wheel, and automatically projectable with the start of slipping of said tire relatively to the road-surface.

21. An antiskid device for wheel tires comprising a plurality of interconnected units each having a road-surface gripping claw lying in the same radial plane, when in operative position, as the body of the unit, said claws being normally depressible to inoperative position within a tire groove during rotation of a wheel and automatically projectable into road-surface engagement simultaneously with the start of slipping of said tire relatively to said surface.

22. An antiskid device for wheel tires comprising a plurality of interconnected extensible and contractable units each having a pair of oppositely directed gripping claws lying in the same radial plane, when in operative position, as the body of the unit, said claws being normally depressible to inoperative position within said groove and automatically projectable into road-surface engagement simultaneously with the start of slipping of said tire, in either direction, relatively to the road surface.

23. In an antiskid device for wheel tires, an interchangeable unit comprising a bar having its opposite ends bent upon itself to form road-surface gripping claws lying in the same radial plane as the bar, when in operative position, and eyes within the bends of said claws to receive corresponding claws of other links.

24. In an antiskid device, an interchangeable unit comprising a bar having its opposite ends bent upon itself to form oppositely directed road-surface gripping claws normally depressible to inoperative position during rotation of a wheel, said claws lying in the same radial plane as the bar when said unit is in operative position, and eyes within the bends of said claws to receive the corresponding claws of other links for assembling a tire encircling ring of said units, said eyes being disposed, approximately, at right angles, one to the other.

25. An antiskid device for wheel tires comprising an extensible resilient band adapted to be seated in a tire groove, and road surface engaging means carried by said band and automatically retractable into and projectable from said groove to and from engagement with a road surface.

26. An antiskid device for wheel tires comprising a circumferential, extensible, resilient band adapted to be removably seated in a tire groove and road surface engaging means carried by said band and automatically retractable into and projectable from said groove to and from engagement with a road surface.

HARRY R. ANSEL.